United States Patent [19]

Hansen et al.

[11] Patent Number: 5,030,464

[45] Date of Patent: Jul. 9, 1991

[54] LIQUID SMOKE IMPREGNATED PEELABLE FIBROUS FOOD CASING, MANFUACTURE AND USE

[75] Inventors: James R. Hansen, Tinley Park; Myron D. Nicholson, Lemont; Jeffrey B. Sherry, Downers Grove, all of Ill.

[73] Assignee: Viskase Corporation, Chicago, Ill.

[21] Appl. No.: 403,964

[22] Filed: Sep. 7, 1989

Related U.S. Application Data

[62] Division of Ser. No. 117,863, Nov. 9, 1987, Pat. No. 4,889,751.

[51] Int. Cl.$^5$ ............................................. A23L 1/31
[52] U.S. Cl. ................................... 426/420; 426/650
[58] Field of Search ..................... 427/230, 439, 402; 426/534, 650, 413, 420; 17/49

[56] References Cited

U.S. PATENT DOCUMENTS

| 2,901,358 | 8/1959 | Underwood et al. | 99/176 |
| 3,905,397 | 9/1975 | Chiu | 138/118.1 |
| 4,377,187 | 3/1983 | Chiu | 138/118.1 |
| 4,505,939 | 3/1985 | Chiu | 426/135 |
| 4,592,918 | 6/1986 | Chiu | 426/533 |

Primary Examiner—James J. Seidleck
Attorney, Agent, or Firm—Cedric M. Richeson

[57] ABSTRACT

Manufacture and use of a fiber-reinforced cellulosic casing article with 40%–65% moisture, a first ketene dimer peeling aid coating on the casing inner surface, a second wood-derived tar-containing liquid smoke coating and precipitated tar having a single mode mass spectrometric distribution below 400 atomic mass units.

28 Claims, 2 Drawing Sheets

LIQUID SMOKE IMPREGNATED PEELABLE FIBROUS FOOD CASING, MANUFACTURE AND USE

This application is a division of prior U.S. application Ser. No. 07/117,863 filing date Nov. 9, 1987, which issued Dec. 26, 1989 as U.S. Pat. No. 4,889,751.

BACKGROUND OF THE INVENTION

This invention relates to a wood-derived liquid smoke impregnated fibrous cellulosic casing article which is peelable from the encased foodstuff processed therein, a method for manufacturing the casing article, and a process for preparing encased foodstuffs using the casing article.

Liquid smoke may be an aqueous solution of natural wood smoke constituents prepared by burning a wood, for example hickory or maple, and capturing the natural smoke constituents in water. Alternatively, the liquid smoke may be derived from the destructive distillation of wood, that is, the breakdown or cracking of the wood fibers into various compounds which are distilled out of the wood char residue. For purposes of this invention, liquid smoke from both types of processes will be characterized as "wood-derived", and used in the aqueous form. Wood-derived aqueous liquid smokes are generally very acidic, usually having a pH as low as 2, and a total acid content of at least 3%.

Such liquid smokes may be used to impregnate the inner or outer wall of cellulosic food casings, and then transfer smoke color and/or flavor to food stuffed in the casing during processing at elevated temperatures. During this processing, the active constituents of the impregnated liquid smoke impart color and flavor to the encased food, as for example described in U.S. Pat. No. 4,377,187 to Chui in connection with fibrous cellulosic casings. By reference, Patent '187 is incorporated herein to the extent pertinent.

The as-marketed or "as-is" liquid smoke contains wood tars derived from polymerized hydrocarbons, and this tar is generally in the soluble form. However, when the as-is highly acidic liquid smoke is impregnated in the inner or outer surface of gel stock cellulosic food casings, it tends to form a tarry deposit on the carrier and squeeze rolls of the smoke treatment unit, thereby eventually forcing shutdown of the treating system. To obviate this problem, various methods have been developed to remove tar from the as-is liquid smoke before the liquid is impregnated in the cellulosic casing wall. As for example described in U.S. Pat. No. 4,592,918 to Chiu (incorporated herein by reference to the extent pertinent), these methods include at least partially neutralizing the liquid smoke to raise the pH above about 4 to form a tar-enriched fraction and a tar-depleted fraction which are separated so that the latter becomes a tar-depleted aqueous liquid smoke. The temperature is preferably maintained below about 40° C. during this neutralization to partially avoid diminishment of liquid smoke staining power and/or absorptive power. Another method of tar depletion is by contacting the tar-containing liquid smoke with an organic liquid solvent under extraction conditions to form a tar-enriched liquid solvent fraction and a tar-depleted liquid smoke fraction. The fractions are separated and the latter is recovered as a tar-depleted aqueous liquid smoke.

The tubular cellulosic casings may be either small diameter, i.e. below about 40 mm., or larger diameter which is generally in the range of between about 40 mm. and about 160 mm. These casings may have fibrous e.g. paper reinforcement in the casing wall to provide dimensional stability, and most large diameter cellulosic casings are the fibrous type. Liquid smoke, like other liquid coatings, may be applied to the fibrous cellulosic casing wall by any of several methods described in the patent literature. For example, U.S. Pat. No. 3,451,827 describes a spraying method for applying a variety of coating materials over the casing internal surface. In U.S. Pat. No. 3,378,379 to Shiner et al, a "slugging" method is described for applying coating materials to the casing internal surface.

In the preparation and use of fibrous cellulosic food casings, the moisture content of the casings is of considerable importance. By way of non-limiting illustration, the casings may be shirred, i.e. compressed into a tightly compacted and pleated "stick" form by the casing manufacturer. The food processor secures a deshirred end of the casing end to the stuffing apparatus and fills the opened casing. To facilitate shirring operations on these casings without damaging them, it is generally necessary that they have a relatively low water content, usually in the range of from about 11% to about 17% by weight of total casing (16 to 28 by weight of dry cellulose), a moisture content which is relatively low compared to the moisture content required when the casing is used for food stuffing. To permit shirred fibrous casing to be stuffed without breaking of the casing during the stuffing operation, shirred fibrous casings having an average moisture content of between about 17% to about 35% of total casing weight (28% to 65% by weight dry cellulose) are required. As used hereinafter, the expression "moisture content" refers to the weight percent of water or moisture in the casing based on the weight of dry cellulose in the casing article unless another basis is specifically indicated.

Even if the fibrous casings are to be supplied in the flattened or reeled form for stuffing, they are quite stiff in the dry stock form and must have a relatively high moisture content to be sufficiently soft for stuffing without casing damage. For many years this was accomplished by soaking in water just prior to stuffing, usually for about one hour, resulting in full moisture saturation to about 150% dry cellulose (60% by weight of the total casing). With the advent of automatic high speed, high pressure stuffing equipment for products employing fibrous cellulosic casing and the need for greater control of the encased food manufacturing method for example to achieve more uniform food product, the "no soak" system was developed. This involves premoisturization of the casing prior to shirring and/or stuffing so that the fibrous cellulosic casing contains the needed moisture for stuffing without soaking. Typically a premoisturized fibrous cellulosic casing contains between about 25% and about 65% water.

Another important constituent in liquid smoke-impregnated premoisturized fibrous cellulosic casing articles is a peeling aid or "easy-peel" constituent. In particular, agents for improving the peelability of the fibrous casings from encased food products after elevated temperature processing are commonly employed. Such peelability enhancing agents include (but are not limited to) carboxymethyl cellulose and other water soluble cellulose ethers as for example described in U.S. Pat. No. 3,898,348 to Chiu et al. Another commonly used peeling aid is "Aquapel", a Hercules, Inc. trademarked product comprising alkyl ketene dimers as for example described in U.S. Pat. No. 3,905,397 to Chiu, the disclosure of which is incorporated by reference. Still another widely used peeling aid for fibrous cellulosic casings is "Quilon", an E. I. DuPont trademarked product comprising fatty acid chromyl chlorides, as for example described in U.S. Pat. No. 2,901,358 to Underwood.

Since the peeling aid must be in direct contact with the casing surface for maximum effectiveness, the prior art has preferred to apply the liquid smoke as a superimposed second coating to an already existing peeling aid coating on the casing internal surface. The resulting article may comprise a no-soak type fibrous casing article with a first Aquapel or Quilon—type peeling aid coating on the casing inner surface and a low pH as-is liquid smoke coating such as Charsol C-12 or Hickory Super Smoke superimposed on and impregnated into the first peeling aid coating. This article typically with a 32% moisture content (dry cellulose basis) has been commercially used with the SHIRMATIC 600A stuffing system (manufactured and marketed by Viskase Corporation) for producing sliced meat products as for example bologna. The article is supplied in shirred form as a stick comprising about 175-200 feet of flat casing, and used in this system to produce encased unprocessed food product at high speed. This article and the SHIRMATIC 600A system are described in copending application Ser. No. 929,455 filed Nov. 12, 1986 in the name of A. P. Urbutis. In brief, the shirred stick is deshirred, inflated and progressively drawn over an internally positioned plastic disc for transverse stretching and sizing at the rate of about 60 ft/minute. The resulting encased but unprocessed food product is gathered and clipped at the upstream end, and cut into sections of stuffed length, e.g. about 3-6 feet.

Notwithstanding the continuous frictional contact between the liquid smoke coating of the casing article and the leading surface of the plastic sizing disc, a tar coating does not appear on the disc leading surface during this commercial operation. On hindsight and based on the problem faced and overcome by the present invention, this is probably in part because each sizing disc is only used with one casing stick of about 175 ft. length, and then discarded.

Tar containing liquid smoke is manufactured by the controlled partial oxidation of wood to form vapor containing coloring and flavoring constituents and tar, with recovery of this vapor as condensate in water, and is classified by its total acid content. As will be explained hereinafter in detail, total acid content is a qualitative measure of the absorptive or staining power of the as-manufactured liquid smoke. When impregnated in cellulosic casings, higher total acid content liquid smokes generally provide more flavoring and darker colored casings and darker encased food product surface than lower total acid content liquid smokes.

Figure 1:
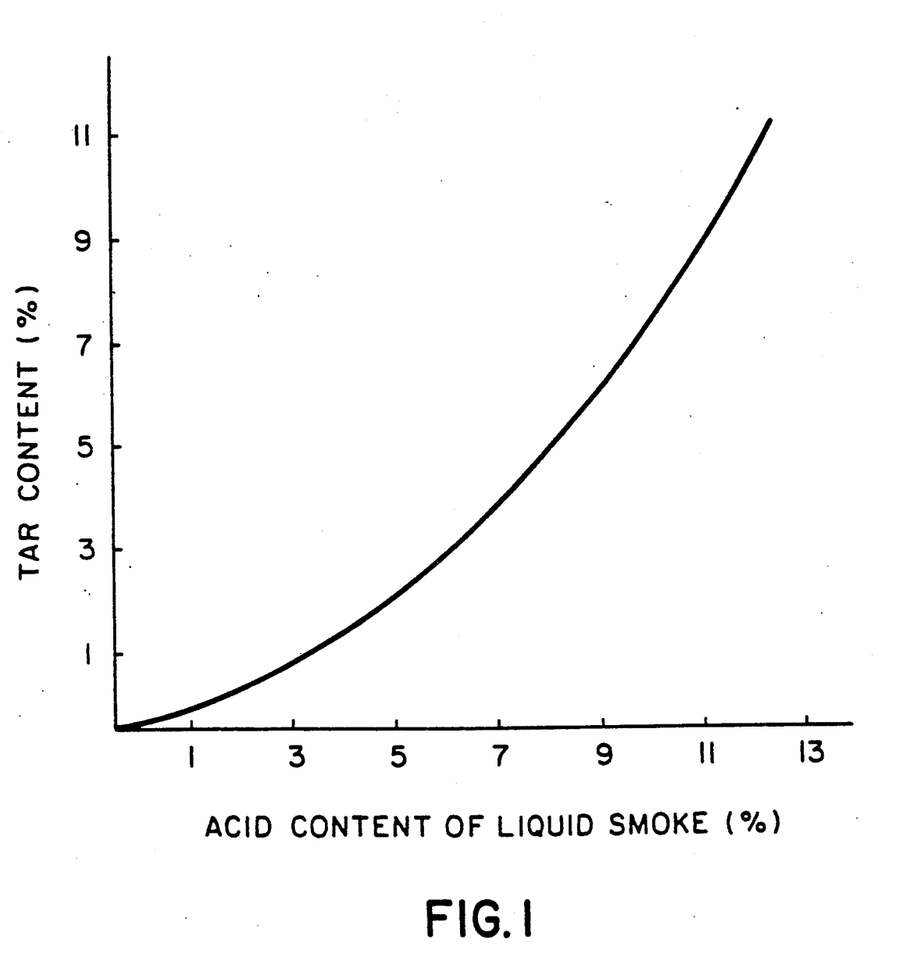
FIG. 1 is a graph showing tar content and solubility as a function of the acid content in wood-derived liquid smokes.

During the manufacture of wood-derived liquid smoke, the total acid content is monitored and increases as more smoke vapor is recovered as condensate. In addition to increasing total acid content, the concentration of tar-like components also increases. This undesirable aspect of high acid content-stronger flavoring and darker coloring liquid smokes is due to the tar's increased solubility in lower pH—higher acidity environments. This relationship is illustrated in FIG. 1.

With wood-derived liquid smokes of less than about 6% acid content having tar contents less than about 3 wt.%, dilution with water results in a stable solution maintaining its clarity. However, for liquid smokes having higher acid content and thus higher tar content, water dilution causes soluble tars to precipitate. This is because, as the pH is raised from the initially low value of the highly acidic as-is smoke, the acid environment is altered. The tar solubility is decreased and the tars precipitate from the solution until a stable solubility level is reached. Referring to FIG. 1, the curve indicates this tar solubility limit for aqueous liquid smokes of various acid contents. A mixture on the left side of the curve will precipitate additional tar and a mixture on the right side of the curve is stable.

The aforedescribed immiscibility of high acid content liquid smokes with water is referred to as "shocking" by those skilled in the art. When the wood-derived liquid smoke is shocked with water dilution, it becomes a milky color. Soon the tar droplets coalesce and precipitate.

Figure 2:
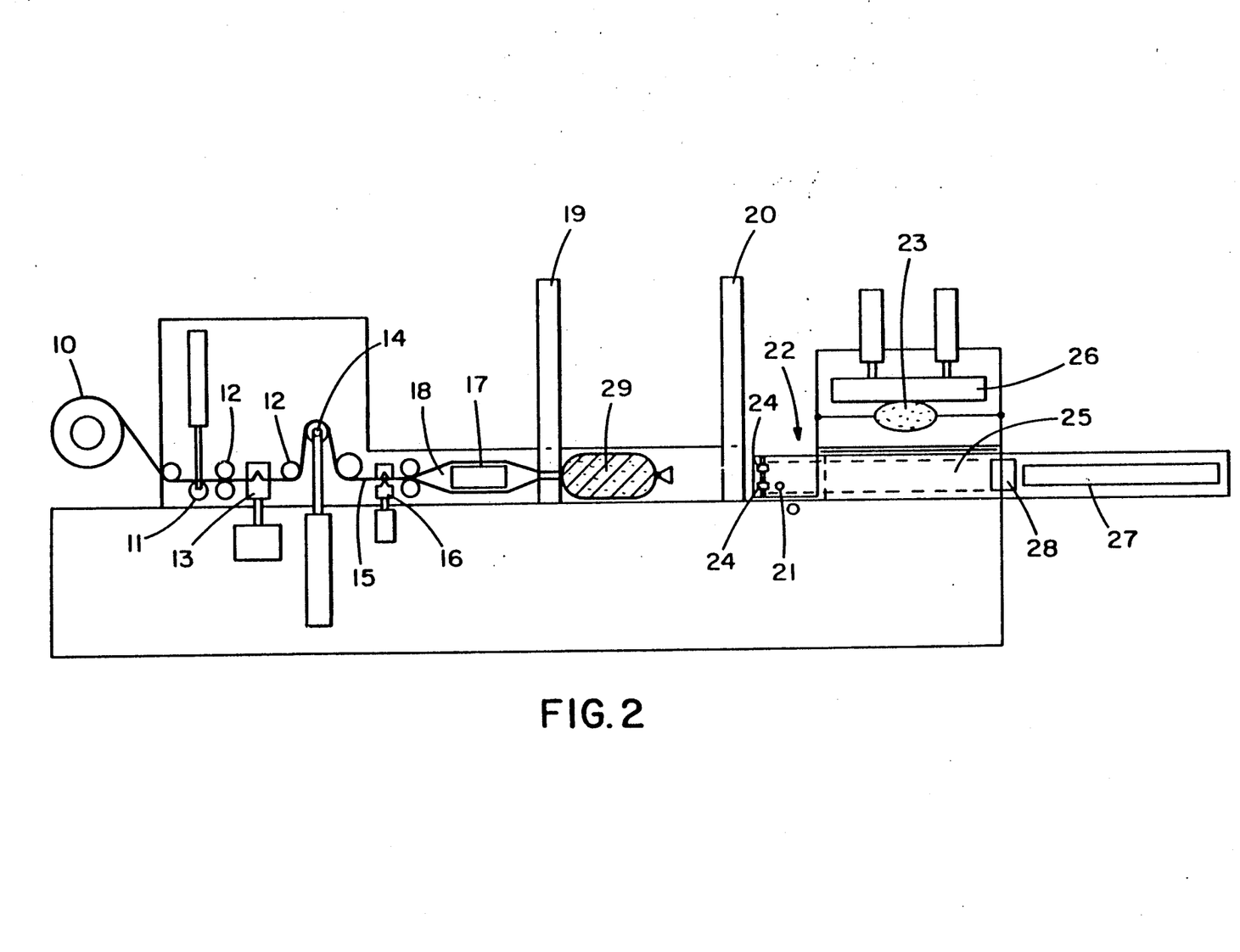
FIG. 2 is a schematic drawing of a Futaba system for stuffing hams in reeled fibrous cellulosic casing.

In certain types of food stuffing apparatus as for example the Futaba "Reel Pak" ham stuffer, there is repeated frictional contact between the unreeled fibrous cellulosic casing inner and outer surfaces and certain apparatus component(s). As illustrated in FIG. 2, a longitudinally moving shuttle is positioned within the opened casing in preparation for stuffing the ham inside the casing, and also to move the casing to the stuffing position. Each reel of fibrous cellulosic casing is on the order of 1000-1500 feet or more long, so that the shuttle and the rollers, clamps and other machine surface between the shuttle and the reeled casing supply are in repeated frictional contact with a long length of casing. For example, based on an eight hour shift and a production rate of 8 hams/minute, the Futaba shuttle contacts about 6,000 to 8,000 feet of fibrous cellulosic casing inner and outer surfaces. In contrast, each sizing disc in the aforedescribed SHIRMATIC 600A shirred stick casing article is implanted in the deshirred casing end and only contacts about 175-200 feet of casing inner surface in its particular stick and is then discarded.

Another difference between the Futaba and SHIRMATIC 600A type stuffing systems is that the fibrous cellulosic casing is subject to more physical abuse in the Futaba, i.e., more distortion in the form of bending and stretching. As a result, the Futaba system requires a more plasticized casing to withstand this distortion. In particular, it has been determined that to avoid physical damage and for high speed production, fibrous cellulosic casing must have about 8% more moisture (BD cellulose basis) for Futaba stuffing than SHIRMATIC 600A stuffing. On the other hand, excessive moisture should be avoided to minimize surface moisture and seepage from the core which would cause handling problems. This means that a fibrous cellulosic casing moisture content between about 40% and about 65% is required for stuffing in equipment of this type wherein the casing is exposed to extreme abuse and excessive tension. A preferred balance of this characteristic is a moisture content between about 45% and about 55% bone dry cellulose.

For certain end uses, the liquid smoke impregnated fibrous cellulosic casing must have the ability to impart a relatively dark color and/or strong smoke flavor to the encased foodstuff, i.e. the casing must have an absorptive index of at least about 0.4 at 340 nm. wave length. On the other hand, for stuffing without damage, i.e. breakage, the fibrous cellulosic casing must be strong in the machine direction and stretchable in the transverse direction, and this requires a relatively high water content, as previously explained. Also, for the convenience of the food processor, the moisture required for stuffing is preferably included by the casing manufacture as a "no soak" type so that processor need not further moisturize before stuffing.

There is a conflict between these requirements, because the water content of the high acid liquid smokes required for the impregnation to realize the desired absorptive index is not sufficient to simultaneously provide the fibrous cellulosic casing with the required moisture content. For example, using as-purchased ("as-is") "Charsol C-12" liquid smoke with a 12% total acid content, to obtain an absorptive index of 0.4 in fibrous cellulosic casing, 12 mg/in² of the liquid smoke are required for slugging to achieve the desired impregnated coating on the casing inner surface. The moisture content of the resulting liquid smoke impregnated casing will be about 24 wt.% $H_2O$ (BD cellulose)—substantially below the 40 wt.% $H_2O$ lower limit required for stuffing without casing damage.

It is, of course, possible to use more than one liquid smoke impregnation treatment but this is inefficient and expensive. Also, two or more smoke treatments introduce additional problems because each of the as-purchased liquid smokes has a particular ratio of active smoke constituents and water, and is difficult to achieve a different ratio of active smoke constitutents: water which is required in the smoke-impregnated casing.

For these reasons, it is preferred to manufacture liquid smoke impregnated fibrous cellulose casings by first introducing the liquid smoke quantity required for the desired absorptive index, and then further moisturizing the liquid smoke impregnated casing to the required water content. However, when this is done the tar solubility limit is exceeded and tar particles precipitate within the smoke coating and the cellulose wall, for reasons explained in connection with FIG. 1. As a result, the further moisturized liquid smoke impregnated fibrous cellulosic casing is characterized by high levels of smoke and precipitated tar components on its internal surfaces. As will be demonstrated in the Examples, this occurs when the liquid smoke is the as-purchased type with its full tar content, and also to a lesser extent when tars are partially removed to provide a tar-depleted liquid smoke as the impregnating liquid. It will also be demonstrated that the same phenomenon occurs when before impregnation in the casing wall, the as-purchased low pH soluble tar-containing liquid smoke is contacted with base for neutralization and in situ tar precipitation, and further addition of base to increase the pH for resolubilization of tar.

However, it will further be demonstrated that the precipitated tars derived from the as-purchased liquid smoke and the tar-depleted liquid smoke are distinctly different from the precipitated tars derived from the high pH resolubilized tar-containing liquid smoke. This difference (based on distribution of atomic mass units as measured by a mass spectrometer) is an important aspect of the invention.

A Quilon C peeling aid first coating—Hickory Super Smoke second coating, fibrous cellulosic casing article was commercially used in reel form with a Futaba apparatus of the FIG. 2 type to stuff hams. After liquid smoke impregnation in the casing inner surface, the article was further moisturized to about 52% water (BD cellulose). In this commercial operation there was a substantial accumulation of tar on the shuttle and other upstream components of the Futaba type apparatus after only 30 minutes operation and consumption of about 450 feet of casing. Since the casing used in the Futaba system is prestuck for release of air during stuffing, there are openings through the casing wall portion permitting tar migration to the casing outer surface and accumulation on the machine parts contacting this surface. When enough tar accumulated on the guide rollers, clamps and other machine components as well as the shuttle, the tar started to come off in patches and cover the casing in spots, tending to make the ham blotchy or covered with dark spots. The food processor regarded the problem as sufficiently important to require shut down for cleaning the shuttle and other surfaces to avoid eventual binding of the casing.

An object of the present invention is to provide a fibrous cellulosic casing article with a first peeling aid coating on its inner surface and a second wood derived liquid smoke coating over the first peeling aid coating, which provides a casing absorptive index of at least 0.4 for transfer of smoke color and flavor to encased food, the casing having sufficient moisture to provide stretch flexibility during stuffing without breakage and without causing tar accumulation on "repeated frictional contact" between the liquid smoke coating and the stuffing apparatus part(s) which contact the inside and outside surfaces of the casing.

Another object is to provide an efficient method for manufacturing the aforedescribed casing article which does not require multiple liquid smoke impregnation steps.

Still another object is to provide a process for preparing encased foodstuffs such as ham, using the aforedescribed casing article and without experiencing the tar accumulation problem on the stuffing apparatus parts even though these parts and the liquid smoke coating have repeated frictional contact during the process.

Other objects and advantages of the invention will be apparent from the ensuing disclosure and appended claims.

As used herein "repeated frictional contact" means that at least 450 linear feet of liquid smoke coating on the fibrous cellulosic casing inner and/or outer surfaces, or the equivalent thereof, is in moving rubbing contact with at least one part of the stuffing apparatus. This rubbing contact may be continuous and unidirectional, so that only 450 feet of casing are required. Alternatively, the rubbing contact may intermittent and unidirectional, so that more than 450 feet of casing are required. As a further variation, the rubbing contact may be bidirectional (i.e. in opposite directions) and if continuous, only 225 feet of casing are required.

Although repeated frictional contact will be specifically described herein in connection with the Futaba type system wherein the casing is drawn from a reel in flat form, repeated frictional contact may also occur in certain types of food stuffing systems in which the casing is supplied in the shirred stick form. For example, the T-Sizer system marketed by Teepak, Inc. employs a sizing disk which is a permanent part of the machine (unlike the SHIRMATIC 600A system). Repeated frictional contact occurs in the T-Sizer system when multiple sticks having a combined flat length of at least 450 feet are consecutively contacted with the same machine-mounted sizing disk. This general type of stuffing apparatus with permanently mounted sizing means is described in U.S. Pat. No. 4,558,488 to Martinek.

SUMMARY OF THE INVENTION

According to this invention, a fiber-reinforced cellulosic casing article is provided having between about 40% and about 65% moisture content based on the dry cellulose weight, and a first ketene dimer peeling aid coating on the casing inner surface. A second wood-derived, tar-containing liquid smoke coating is superimposed on and impregnated into the first ketene dimer peeling aid coating. The impregnated tar-containing liquid smoke coating is in sufficient quantity to provide casing absorptive index of at least about 0.4, the tar having a single mode mass spectrometric distribution below about 400 atomic mass units (preferably between about 200 and about 250 atomic mass units) precipitated in the first and second coatings and within the casing wall. The casing pH is preferably between about 2 and about 8.5.

Another aspect of the invention is a method which can be used to manufacture a premoisturized ready-to-stuff, wood derived and tar-containing liquid smoke impregnated peelable fiber-reinforced casing article of the type described in the preceding paragraph. This method comprises the steps of: (a) providing a fiber-reinforced cellulosic casing, (b) applying a first ketene dimer peeling aid coating on the casing inner surface at loading of at least about 0.05 mg/in$^2$, and (c) applying a second wood-derived, tar-containing liquid smoke coating from aqueous liquid smoke having total acid content of at least about 11.5% on said first ketene dimer peeling aid coating from an aqueous solution for impregnation therein and into the cellulose wall. The second liquid smoke coating is applied in sufficient quantity to provide casing absorptive index of at least about 0.4, and increase the moisture content to between about 25 and about 35 weight % dry cellulose. The article is then further moisturized to between about 40% and about 65% dry cellulose, such that tar having a single mode mass spectrometric distribution below about 400 atomic mass units is precipitated in each of the first and second coatings and also within the casing wall.

Still another aspect of the invention relates to a process for stuffing food mass, for example hams, in a wood-derived tar-containing liquid smoke coated, fiber-reinforced peelable cellulosic casing using stuffing apparatus with a part in repeated frictional contact with the liquid smoke coating on a casing inner surface. In this process at least one part of the stuffing apparatus is placed in repeated frictional contact with the liquid smoke coating of the previously described casing article without substantial tar transfer from the liquid smoke coating to the stuffing apparatus part. The food mass is stuffed in the casing article. The stuffing apparatus part may be a horizontally reciprocal shuttle which moves the opened casing end horizontally with the shuttle outer surface inside and in contiguous rubbing association with the liquid smoke coating as at least part of the repeated frictional contact. In a preferred embodiment the casing article is provided in the flat reeled form of at least 450 feet length. After processing the food mass at elevated temperature the casing may be peeled from the processed food mass by the food processor or ultimately by the consumer.

In another more specific process aspect, an encased ham product is prepared using the aforedescribed cellulosic casing article in the flat, reeled form having length of at least about 450 feet. An open end of the flat casing article is unwound, and the inside surface thereof is extended over one end of a horizontally reciprocal cylindrically shaped shuttle at a first position. The casing open end-shuttle assembly is horizontally moved from the first position to a second position. The casing open end is extended over the first end of a stuffing horn in securing relation thereto at the second position.

A ham article is pushed through an open second end of the stuffing horn and outwardly through the casing first end into the casing article itself. The ham-enclosing casing article is first clipped at a longitudinal position between the ham and the horn first end so as to form a first closed end. The shuttle is horizontally retracted from the second position through the casing article in repeated frictional contact with the casing liquid smoke coating to the first position.

The first clipped ham-containing casing article is second clipped at a longitudinal position between the retracted shuttle and the ham-enclosing casing article. The second clipped article is severed between the now clipped second end and the retracted shuttle. The first clipped and second clipped and severed ham-containing casing article is removed as the encased food product. Then the aforedescribed steps are repeated with additional sections of the reeled casing article and additional hams until the reeled casing article is exhausted.

As will be demonstrated by comparative tests, the present article (made by the abovedescribed method) is superior to the Quilon-type peeling aid article in the sense of avoiding substantial tar deposition and buildup on surfaces in repeated frictional contact with the liquid smoke coating. The same advantage has been demonstrated when used to encase ham in Futaba-type stuffing machines. That is, in sustained commercial operation there was no appreciable tar buildup on the machine shuttle and other machine parts.

DETAILED DESCRIPTION OF THE INVENTION

The following expressions and terms are used herein to describe the invention and for present purposes are measured according to the procedures described in the previously referenced and incorporated Chiu U.S. Pat. No. 4,592,918: total acid content and total acidity, total solid, percent light transmittance, absorptive power and absorptive index.

Table A lists certain of the commercially available wood-derived liquid smokes and their characteristics. These liquid smokes are useful in practicing this invention.

It is recognized by the liquid smoke art that color and flavor transfer diminishes with increasing pH. Moreover, it is known that cellulosic casings tend to weaken with increasing pH. For these reasons, the pH of the fiber-reinforced cellulosic casing article of this invention is preferably between about 3 and about 5.

Suitable "tar-containing" liquid smokes include those wood-derived liquid smokes which have a light transmittance less than 50%. These tar-containing liquid smokes are thus distinguished from those substantially tar-depleted aqueous liquid smokes which must have a light transmittance of at least about 50%. Percent light transmittance (relative to water) is inversely related to tar content of the tested liquid smoke, i.e. higher tar content results in a cloudy liquid with low light transmittance. The procedure for measuring light transmittance is to thoroughly mix a 1 ml. aliquot of the liquid smoke with 10 ml. of water, and determine its turbidity-transmittance at a wavelength of 590 nm., on a spectrophotometer. The higher the percent transmittance reading, the lower the residual tar concentration in the liquid smoke composition. As used herein "light transmittance" refers to the intrinsic light transmittance of the liquid smoke without addition of materials which may significantly affect the percent light transmittance.

As-is, tar-containing liquid smoke will typically have a light transmittance of less than about 10%. Preferred tar-containing liquid smokes have a light transmittance of about 0 (zero).

TABLE A

| Manufacturers Designation | Commercially Available Wood-Derived Liquid Smokes | | | |
|---|---|---|---|---|
| | Total Acid Content[e] % | Total Solid % | % Light Transmittance | Absorptive Power[d] |
| Super Smoke[f] | 15.5–16.5 | 25–26 | 0 | 1.3 |
| Zesti Smoke Code-12[f] | 12.0 | 10 (about) | 0 | 0.60 |
| Royal Smoke AA[a] | 11.5–12.0 | 10.2 | 0 | 0.68 |
| Royal Smoke A[a] | 10.5–11.0 | 9.0 | 0 | 0.42 |
| Royal Smoke B[a] | 8.5–9.0 | 8.8 | 0 | 0.36 |
| Royal Smoke 16[a] | 10.0–10.5 | 17.6 | 0 | 0.62 |
| Charsol C-12[b] | 12.0–12.5 | 8.3 | 0 | 0.54 |
| Charsol C-10[b] | 11.5 | not reported | 0 | 0.40 |
| Smokaroma Code-12[c] | 12.0 | 10.5 | 0 | — |

[a] Griffith Laboratories, Inc. 12200 South Central Ave., Alsip, IL
[b] Red Arrow Products Co., P.O. Box 507, Manitowoc, WI
[c] Meat Industry Suppliers, Inc. 770 Frontage Road, Northfield, IL
[d] Measured at 340 nm
[e] Also referred to as "Total Acidity"
[f] Hickory Specialties Co., Crossville, TN In a preferred embodiment the absorptive index of the present cellulosic casing article is at least about 1 so as to impart very substantial levels of smoke color and flavor to the encased food during processing. For this purpose, the preferred liquid smoke is Super Smoke, as described in Table A.

The peeling aid coating used in the present invention is formed from ketene dimers derived from long chain fatty acids, of the general formula:

wherein $R_1$ and $R_2$ are alkyl (either saturated or unsaturated) groups of at least eight carbon atoms and preferably between twelve and eighteen carbon atoms. The preferred Aquapel 421 is the ketene dimer of oleic acid, with eighteen carbon atoms in both $R_1$ and $R_2$. Another suitable ketene dimer is Aquapel 360XC, which is believed to have $C_{16}$–$C_{18}$ alkyl groups, and derived from a mixture of palmitic and stearic fatty acid ketenes. Ketene dimers are for example described in U.S. Pat. No. 3,905,397 to Chiu.

The Quilon-type peeling aids referred to herein are a family of water soluble fatty chromium complexes, derived from $C_{14}$–$C_{18}$ fatty acids, as for example stearato chromic chloride.

Referring now to FIG. 2, this is a schematic drawing taken in longitudinal elevation of a Futaba FUT X-70 ham stuffer system, as previously described in general terms. Although FIG. 2 illustrates the system during second clipping of the encased ham product, the entire operating sequence will be apparent from the following description. The flattened fibrous cellulosic casing article in reeled form 10 is horizontally positioned on the left side of the apparatus and one end is laced above unwind cylinder roll 11, through a series of transversely positioned rolls 12, past large casing clamp 13 and then past casing pull cylinder assembly 14 shown in the vertically projected position. This cylinder assembly upwardly displaces the still flat casing to longitudinally retract same as hereinafter explained in detail.

The flat casing 15 is moved past small casing clamp 16 and is again in the original horizontal position. Clamp 16 is shown in the opened position to horizontally align the casing, while the large casing clamp 13 is shown in the closed position. Horizontally aligned cylindrically shaped shuttle 17 is longitudinally positioned immediately downstream from small casing clamp 16 with one end extending into the opened end 18 of the casing article. Opened end 18 is secured to shuttle 17 by an externally actuated gripping mechanism (not illustrated) for pulling the now-opened casing past retracted second clipping means 19 and longitudinally spaced retracted first clipping means 20 to a position with its open end concentrically extending over the horizontally aligned open first end 21 of stuffing horn 22.

In operation, small clamp 16 when closed restrains casing 15 while shuttle 17 is positioned with the casing inside surface open end 18 horizontally oriented over the leading shuttle surface. Then the externally actuated gripping mechanism clamps the casing opened end 18 to the shuttle 17 outer surface and small clamp 16 and large clamp 13 is opened to allow forward movement of the casing open end-shuttle assembly from this first position to a second position.

At the second position the casing open end-shuttle assembly is stopped by the first open end 21 of stuffing horn 22 and the shuttle 17 places the casing open end over the stuffing horn first open end. Stuffing horn casing clamp 24 secures the casing open end to the stuffing horn outer surface. Shuttle 17 is horizontally retracted from this second position through the casing article in repeated frictional contact with the casing liquid smoke coating to the first position.

Ham 23 has been vertically lowered into chamber 25 with the aid of compression bar 26, the chamber 25 being horizontally aligned with the shuttle-horn assembly. Ham 23 is horizontally pushed by means of stuffing cylinder 27 into the horn second end 28, through the horn 22 and into the opened casing article to a longitudinal position between first clipping means 20 and second clipping means 19.

One clip is applied by first clipping means 20 at the casing open end to close same. Then large casing clamp 13 is closed and the casing is horizontally retracted by upward displacement of a flat casing section using the vertical end of pull cylinder 14 positioned against the flat casing 15 bottom surface (as illustrated). The casing horizontal retraction is stopped by the now casing-compacted ham product 29 within the casing length. The casing second end is drawn and closed by a clip applied with second clipping means 19. The casing upstream the clipped second end is severed by means not illustrated, and the encased ham product 29 removed for processing. The aforedescribed cycle is then repeated. Typically each ham requires about 1½ feet of casing so that about 1,000 hams are encased in each 1500 feet of reeled casing article.

It will be apparent from the foregoing description that shuttle 17 is in repeated frictional contact against the casing article internal surface during both the shuttle retraction step and the ham compaction steps. Accordingly, a section of the casing inner surface is frictionally contacted more than once by the shuttle outer surface, and this friction increases the likelihood of tar transfer from the casing to the shuttle. That is, at least some of the particles such as the aforedescribed tar granules which are embedded in the coated casing wall and separable therefrom are likely to be transferred to the shuttle outer surface during this repeated frictional contact. Also, any tar which migrates to the casing outside surface through prestricking holes is transferred to machine components contacting this outer surface, i.e. rolls 12, large casing clamp 13, casing pull cylinder assembly 14 and small casing clamp 16.

In the present method, the second liquid smoke coating increases the article moisture content to between about 20% and about 35% dry cellulose. Lower moisture contents are undesirable since higher breakage will result, and higher moisture contents have the disadvantages of requiring the use of relatively dilute liquid smoke. A preferred balance is moisture content between about 25% and about 37% dry cellulose.

EXAMPLE 1

In this series of tests, fibrous cellulosic casing articles of this invention were compared with similar articles treated with Quilon-type easy-peel coating, using different liquid smokes and various levels of moisturization. Experimental apparatus was used to simulate repeated frictional contact between the casing article inner wall and the food stuffing apparatus components.

More particularly, four different Aquapel 421 easy-peel loadings were applied to the casing inner wall by slugging, along with three different Quilon C easy-peel loadings at loadings either similar or identical to the Aquapel 421 loadings. Two different "as is" tar-containing liquid smokes were impregnated by internal slugging in the easy-peel coated casings at a loading of about 38% bone dry cellulose basis. These liquid smokes were the previously described Hickory Super Smoke and the Red Arrow C-12. The moisture content of these articles was about 32 wt.% water on a bone dry (BD) basis. Certain of the easy-peel coated and liquid smoke impregnated casings were then further moisturized by the addition of 10% water and 20% water, respectively on a BD basis.

In the method of this invention, the liquid smoke used to form the second coating has a total acid content of at least about 11.5% to achieve the desired very substantial smoke color and flavor in the increased food during processing.

The testing apparatus included a circular nylon disc, one-inch thick, having a 15 degree bevel on the leading edge and extending about ¾-inch along the disc edge. The discs were sized to radially stretch the as-is casing about 4–5% in diameter when positioned with its flat surfaces perpendicular to the inflated casing longitudinal axis. For each test, 300 feet of casing was pulled at constant speed (250 ft/min) over the internally positioned disc. The resulting tight disc fit into the casing inner surface forced the casing to move in repeated frictional contact along the beveled edge, depositing smoke and tar solids onto the disc. Visual comparison of the tar "smears" on the discs correlated with the previously observed tendency for the high moisture content easy-peel coated, tar-containing liquid smoke impregnated fibrous cellulosic casing, to deposit tars on the food stuffing apparatus internal contact parts. Based on comparison between tar buildups on these discs and the actual Futaba shuttle using similar casing articles, this repeated frictional contact appears to be qualitatively similar to stuffing of about 450 feet of unreeled casing in the Futaba apparatus.

The results of these tests are qualitatively summarized in Table B.

TABLE B

| | TAR DEPOSITION WITH AS-IS LIQUID SMOKE | | | | |
|---|---|---|---|---|---|
| | Smoke Treatment/Remoisturization Level[b] | | | | |
| EP Treatment[a] | C-12/0% $H_2O$ | C-12/20% $H_2O$ | SM[c]/0% $H_2O$ | SM/10% $H_2O$ | SM/20% $H_2O$ |
| (1) 0.52 Aquapel 421 | Highly Acceptable | Acceptable | Highly Acceptable | Acceptable | Acceptable |
| (2) 0.35 Aquapel 421 | Highly Acceptable | Acceptable | Highly Acceptable | Acceptable | Acceptable |
| (3) 0.17 Aquapel 421 | Highly Acceptable | Acceptable | Highly Acceptable | Acceptable | Acceptable |
| (4) 0.04 Aquapel 421 | Highly Acceptable | Acceptable | Highly Acceptable | Marginally Unacceptable | Highly Unacceptable |
| (5) 0.39 Quilon C | Highly Acceptable | Highly Unacceptable | Highly Acceptable | Unacceptable | Unacceptable |
| (6) 0.19 Quilon C | Highly Acceptable | Highly Unacceptable | Highly Acceptable | Unacceptable | Highly Unacceptable |
| (7) 0.04 Quilon | Highly Acceptable | Highly Unacceptable | Highly Acceptable | Unacceptable | Highly Unacceptable |
| (8) No EP Treatment | Highly Acceptable | Acceptable | Highly Acceptable | Highly Acceptable | Acceptable |

TABLE B-continued

TAR DEPOSITION WITH AS-IS LIQUID SMOKE

| EP Treatment[a] | Smoke Treatment/ Remoisturization Level[b] | | | | |
|---|---|---|---|---|---|
| | C-12/0% H$_2$O | C-12/20% H$_2$O | SM[c]/0% H$_2$O | SM/10% H$_2$O | SM/20% H$_2$O |
| (9) 0.11% Aquapel 360XC | — | — | — | — | Acceptable |

[a]For easy-peel treatments 1-8, the casing had a recommended maximum stuffing diameter of 4.62 inches (117 mm). For EP treatment 9, the casing had a recommended maximum stuffing diameter of 6.67 inches (169 mm). All loadings are in mg. in$^2$ casing surface.
[b]The rating scale based on correlation to stuffing machine frictional surface tar build-up was as follows: Highly Acceptable — no tar, Acceptable — minor tar, Marginally Unacceptable — substantial tar, Unacceptable — heavy tar, Highly Unacceptable — very heavy tar.
[c]"SM" refers to Super Smoke (Hickory).

Table B demonstrates that casing articles which were not further moisturized after liquid smoke impregnation exhibited little or no tar deposition, i.e. there was no problem with 32 wt.% moisture content. The post-moisturization step caused smoke tar precipitation within and on the casing internal surface, causing tar build-up on the repeated frictional contact surface. However, as previously explained, fibrous casing articles at this low moisture level are not functional in certain types of food stuffing apparatus.

It is apparent from Table B that Quilon C easy-peel treatments promote excessive tar deposition on frictional contact surfaces of food stuffing machines, even at loadings as low as 0.04 mg/in$^2$ Quilon. In contrast, Aquapel easy-peel treatments either retard or dramatically reduce or even eliminate tar deposition, thereby alleviating tar build-up problems at all levels except 0.04 mg/in$^2$ Aquapel 421. This very low level easy-peel treatment showed significantly more tar deposition than the higher Aquapel loadings, but is too low to reliably perform the easy-peel function for commercial fibrous cellulosic casings. For this reason, the first ketene dimer peeling aid coating should be applied at loading of at least about 0.05 mg/in$^2$ casing inner surface, preferably at least about 0.1 mg/in$^2$ casing inner surface to insure complete effectiveness.

Liquid smoke impregnated casing articles with no easy-peel treatment exhibited only minor tar deposits, but all tar-containing liquid smoke internally treated fibrous cellulosic casings require some type of internal treatment for peeling. Accordingly this result is not commercially significant.

It is believed that the compatability of Aquapel treatments (above about 0.04 mg/in$^2$) with tar-containing liquid smoke impregnated cellulosic casing in preventing substantial tar build-up on stuffing apparatus repeated frictional contact surfaces, is primarily due to a physical rather than a chemical interaction. If the interaction was purely chemical, the relationship would be expected to be the same for all Aquapel and liquid smoke loadings. Instead, Table B demonstrates that the interaction varies depending on the Aquapel loading, moisture content and type of liquid smoke.

The probable mechanism of this invention is based on the recognition that with both types of easy-peel treatment, the liquid smoke penetrates outwardly through the easy-peel coating on the cellulosic casing inner wall. For Quilon the acid content of the liquid smoke apparently cleaves some of the Quilon-cellulose bonds allowing the easy-peel material to be partially extracted from the casing surface. It is possible that the Quilon easy-peel hydrophobic coating is somewhat porous due to the labile nature of the Quilon linkage to cellulose. Upon further moisturization the tars are shocked out of the liquid phase, as previously explained. They may migrate through a permeable Quilon layer to the cellulose casing surface.

In contrast, the Aquapel easy-peel treatment appears to set up a more impervious coating which is not altered or destroyed by liquid smoke contact. Upon further moisturization, the shocked tars apparently remain in the cellulosic fibrous web, as they cannot readily pass through the Aquapel barrier. That is, the impregnated liquid smoke can initially traverse both the easy-peel and cellulosic barriers, but upon shocking the tars out of solution these high viscosity—high molecular weight compounds can only pass through porous coatings such as Quilon or partial barriers such as the low level (0.04 mg/in$^2$) Aquapel.

On further moisturization, liquid smoke impregnated cellulosic casing without easy-peel treatment does not present a tarring problem because the tars remain in the fibrous web of the cellulosic casing. They are not trapped in a coating layer above the fibrous web surface.

EXAMPLE 2

The present invention has also been successfully demonstrated in connection with the stuffing of ham in commercially operating Futaba machines of the FIG. 2 type.

In these tests, size 7½K cellulosic fibrous casing of 4.62 inches (117 mm) recommended maximum stuffing diameter was provided with an internal Aquapel 421 coating at a loading of about 0.52 mg/in$^2$ by slugging. Next, a Super Smoke type as-is liquid smoke coating (liquid smoke acid content of 15.5–16.5%, absorptive power of 1.3) was applied from an aqueous solution by internal slugging for impregnation into the first peeling aid coating and into the cellulose wall. The pH of the original casing was about 7 and the acidic liquid smoke decreased the casing pH to about 3. The absorptive index of the so-coated casing article was about 2.2. The original casing had a moisture content of about 15% BD cellulose, and the coated casing article had an increased moisture content of about 32% BD cellulose.

The twice coated casing article was then further moisturized to about 52% BD cellulose, and tar precipitated in each of the first and second coatings as well as in the cellulosic casing wall. By visual observation this tar was in the form of small granules, and based on the Example 4 experiments discussed hereinafter, the tar had a single mode mass spectrometric distribution of about 219 atomic mass units.

This description of the casing article manufacturing method illustrates a preferred embodiment in which the liquid smoke absorptive power is at least 0.40 and has a total acid content of at least 12%. These levels insure that a distinct smoke color and flavor are developed in the stuffed food during processing. It also illustrates a more preferred embodiment of the casing manufacturing method wherein the liquid smoke absorptive power is at least about 0.60 and the total acid content is at least about 15%. These levels insure that a dark smoke color and substantial smoke flavor are developed in the processed food.

The resulting further moisturized Aquapel 421 and Super Smoke liquid smoke coated fibrous cellulosic casing article was flattened and coiled in reel form to lengths of about 1500 feet.

The reeled articles were then used in the Futaba stuffer to encase hams. Each reel was fully consumed in continuous operation and there was no apparent buildup of tar on the Futaba shuttles after consumption of two reels (3,000 feet of casing article). This was a striking improvement from the substantial tar buildup on the Futaba shuttles with reels of casing articles employing a prior art Quilon C peeling aid coating at loading of about 0.04 mg/in$^2$ casing surface. As previously indicated, this tar buildup occurred after consumption of only about 450 feet of casing article. All other characteristics of these articles were substantially identical to the above-described Aquapel 421 coated article.

EXAMPLE 3

Another series of tests were conducted with the Example 1 experimental apparatus to simulate repeated frictional contact between the casing article inner wall and the food stuffing apparatus components. Here the wood-derived liquid smoke coatings were based on Charsol C-10 as-is liquid smoke, but with additional processing steps. In one instance the tar was depleted by solvent extraction and concentrated to one-third its original weight so as to provide tar-depleted liquid smoke having about 70% light transmittance at 590 nm. wave length and absorptive power of about 0.55. The total acid content of this tar-depleted liquid smoke was about 16%.

The Quilon C and Aquapel 421 peeling aid coatings were first applied to the internal surface of the Example 1-type fibrous cellulosic casing samples in loadings of about 0.39 and 0.52 mg/in$^2$ casing surface respectively, and the tar-depleted liquid smoke was then applied over the first coating of each peeling aid type at loading of about 39 wt. % bone dry cellulose basis. The moisture content of the so-coated articles was about 35% BD cellulose and these articles were further moisturized to a level of about 55% BD cellulose whereupon granular tar precipitation was observed in the first peeling aid and second liquid smoke coatings as well as through the cellulose casing wall (samples 10 and 11). However, the quantity and size of the tar granules was significantly lower than the Table B samples having the most similar peeling aid, liquid smoke and moisture contents. This was undoubtedly due to the tar-depleted condition of the liquid smoke used in the impregnations of this Example 4. The pH of these coated casing articles was about 3.

Another set of samples (Nos. 12 and 13) were also based on Super Smoke as-is liquid smoke coating over either Quilon C or Aquapel 421 coating on the same type of fibrous cellulosic casing. In each instance, the first peeling aid coating was applied at a loading of about 0.39 and 0.52 mg/in$^2$ respectively, and the liquid smoke loading was about 39 wt. % thereby providing an absorptive index of about 3.8. Prior to impregnation these liquid smokes were mixed with caustic flakes so as to first neutralize the liquid smoke and precipitate the tar. The liquid smoke pH was further raised to about 12 and the precipitated tars were resolubilized, as for example described in U.S. Pat. No. 4,442,868 to Smith et al. This resolubilized tar-containing liquid smoke was used to impregnate the first peeling aid coating and the underlying cellulosic casing inner surface and wall.

Still another group of samples (No. 14) was Smok-E (Zip) Redi-Reel fibrous casing manufactured by Teepak, Inc. and having a moisture content of about 70 wt. % BD cellulose. Based on a casing pH above 8.5 and visul examination, it is believed that the previously described tar resolubilization procedure described in Smith et al U.S. Pat. No. 4,442,868 was used to manufacture this liquid smoke-impregnated casing article. The latter is used commercially to encase hams by means of the Futaba ham stuffing system described herein.

There was a visual difference in the tar form between the tar-containing and tar-depleted cellulosic casing on one hand, and the resolubilized tar article. The tar had a uniformly granular appearance in the former whereas the resolubilized tar had a streaky, mottled appearance.

The twice coated casing articles with either the tar-depleted liquid smoke or resolubilized tar along with the Smok-E Redi-Reel resolubilized tar casing articles were then tested for tar deposition on the internally positioned nylon disc using the repeated frictional contact procedure described in Example 1, and tar results are summarized in Table C using the same qualitative rating scale as in Table B.

TABLE C

Tar Deposition With Tar-Depleted And Resolubilized Tar Liquid Smoke

| Sample | EP Treatment[a] | Liquid Smoke | Tar Deposition |
|---|---|---|---|
| 10. | 0.52 Aquapel 421 | Tar-Depleted | Highly Acceptable |
| 11. | 0.39 Quilon C | Tar-Depleted | Marginally Unacceptable |
| 12. | 0.52 Aquapel 421 | Tar-Resolubilized | Highly Unacceptable |
| 13. | 0.39 Quilon C | Tar-Resolubilized | Highly Unacceptable |
| 14. | Unknown | Tar-Resolubilized (Smok-E) | Highly Unacceptable |

[a]All loadings are in mg/in$^2$ casing surface.

It will be apparent from Table C that despite use of tar-depleted liquid smoke, tarring still occurs at a marginally unacceptable level when the first peeling aid coating is Quilon C. However, there is substantially no tar deposition when the first peeling and coating is Aquapel 421. The visual difference in tar accumulation between the two discs was dramatic.

With respect to the resolubilized tar—high pH samples, tar accumulation was heavy on both the Quilon C and Aquapel 421 discs, so it is apparent that the present invention is not useful for first ketene dimer peeling aid coated—second tar-containing liquid smoke impregnated fiber-reinforced cellulosic casings of pH greater than about 8.5.

Tar accumulation was also heavy on the Smoke-E disc, and it is apparent that unless special precautions are taken the Smok-E Redi-Reel fibrous cellulosic casing article would cause tar accumulation on the Futaba shuttle and other surfaces in repeated frictional contact with the smoke coating and casing external surface. It is understood that in commerical operation the problem is avoided by running a continuous water stream over these surfaces to remove the soluble tars. This lowers the smokes coloring and flavoring capacity, thereby reducing liquid smoke utilization efficiency. The tar-containing water environment also creates a potential problem of contaminating the recycled meat juice exudate from the casing presticking holes.

EXAMPLE 4

To characterize the liquid smoke-derived tar formed in and on the aforedescribed fiber-reinforced cellulosic casing articles, various tar samples were prepared for molecular weight determination. These tar samples were either obtained directly from the previously described tar-containing liquid smoke treated fiber-reinforced cellulosic casing (for the resolubilized tar samples) or by water shocking the previously described Super Smoke and Zesti Smoke Code 12 as-purchased liquid smokes to precipitate the tar.

More particularly, tar was removed from the discs of the Example 1 testing apparatus as transferred from sample 12 (0.52 mg/in$^2$ Aquapel 421, Super Smoke pH 12 resolubilized tar) and sample 14 (Smok-E pH above 8.5 resolubilized tar). These tars are hereinafter identified as samples 15 and 16, respectively. Tar was also removed from the as-purchased Super Smoke and Zesti Code 12 by diluting same with water until the tar precipitated. The remaining tar-depleted liquid smoke was separated and tars were air dried by evaporation at ambient temperature. These tars are hereinafter identified as samples 17 and 18, respectively.

These four tar samples were analyzed using a mass spectrometer equipped with a solids probe (Model MS-30 manufactured by Kratos Analytical Instruments Inc., Ramsey, N.J.). An isobutane chemical ionization detection mode was employed and the samples were inserted into the ionization chamber at 30° C. and 1 mm Hg. Spectra were obtained at 10 second intervals as the temperature was increased to 350° C. The atomic mass unit (AMU) range scanned was 94–850, and the spectra for each sample was averaged. The data is summarized in Table D.

TABLE D

Tar Molecular Weight

| Sample | Liquid Smoke | Average Molecular Weight 94–399 AMU | Average Molecular Weight 400–700 AMU |
|---|---|---|---|
| 15 | Super Smoke | 169 | 173 |
| 16 | Smok-E | 191 | 487 |
| Average | 15 and 16 | 180 | 480 |
| 17 | Super Smoke | 219 | None Detected |
| 18 | Zesti Smoke Code 12 | 245 | None Detected |
| Average | 17 and 18 | 232 | — |

Inspection of Table D shows that tar samples 15 and 16 (resolubilized tar at pH above 8.5) are bimodal in character, possessing two distinct molecular populations. The largest distribution is centered at about 180 AMU and the second population is at about 480 AMU. This character was consistent for both samples.

In contrast, the tar samples derived from as-is tar-containing smoke have a single mode AMU distribution centering around 232 AMU. For purposes of this invention the one AMU distribution will be described as a single mode mass spectrometric distribution below about 400 atomic mass units. In a preferred embodiment this distribution is between about 200 and about 250 atomic mass units.

Table D clearly shows a distinct difference between the molecular weight distribution of tars formed in neutralization resolubilization processing (samples 15 and 16) and tars formed as a result of shocking the the tars out of solution with water (samples 17 and 18) as for example illustrated in FIG. 1. The single mode mass spectrometric distribution of tars from water shocking as-is liquid smokes (illustrated by samples 17 and 18) has also been observed in tars separated from solvent extracted liquid smoke (see sample 10).

When taken with Example 1, this Example 4 demonstrates that to realize the advantages of this invention, the present casing article, the method for manufacturing this article and the food mass stuffing process must include in situ precipitation of tar having a single mode mass spectrometric distribution below about 400 atomic mass units.

Certain embodiments of the invention have been described and it will be apparent to those skilled in the art that modifications and variations are contemplated without departing from the spirit and scope of the invention.

What is claimed is:

1. A method for manufacturing a premoisturized ready-to-stuff, wood derived and tar-containing liquid smoke impregnated peelable fiber-reinforced cellulosic casing article comprising the steps of:
    (a) providing a fiber-reinforced cellulosic casing;
    (b) applying a first ketene dimer peeling aid coating on the casing inner surfaces at a loading of at least about 0.05 gm/in$^2$ with said ketene dimer having two alkyl groups of at least eight carbon atoms;
    (c) applying a second wood-drived tar-containing liquid smoke coating from liquid having total acid content of at least about 11.5% on said first ketene dimer peeling aid coating from an aqueous solution for impregnation therein and into the cellulose wall, in sufficient quantity to provide a casing absorptive index of at least about 0.4 at 340 nm wavelength and increase the article moisture content to between about 25% and about 35% dry cellulose; further moisturizing the ketene dimer and liquid smoke coated casing article to moisture content between about 40% and about 65% dry cellulose, such that tar having a single mode mass spectrometric distribution below about 400 atomic mass units is precipitated in each of the first and second coatings and also within the casing wall, said tar-containing liquid smoke having a light transmittance at 590 nm of less than 50%.

2. A method according to claim 1 wherein the further moisturized ketene dimer and liquid smoke coated casing article has a casing pH of between about 2 and about 8.5.

3. A method according to claim 2 wherein said second wood-derived tar-containing liquid smoke coating decreases said casing pH to between about 3 and 5.

4. A method according to claim 1 wherein the first ketene dimer peeling aid comprises the ketene dimer of oleic acid.

5. A method according to claim 1 wherein the first ketene dimer peeling aid has alkyl groups comprising 16–18 carbon atoms.

6. A method according to claim 1 wherein the loading of the first ketene dimer peeling aid coating is at least about 0.1 mg/in$^2$ casing surface area.

7. A method according to claim 1 wherein the absorptive power of the liquid smoke is at least about 0.4.

8. A method according to claim 7 wherein the absorptive power of the liquid smoke is about 0.60.

9. A method according to claim 1 wherein said total acid content of the liquid smoke is at least about 12%.

10. A method according to claim 1 wherein said total acid content of the liquid somke is at least about 15%.

11. A method according to claim 1 wherein the absorptive power of the liquid smoke is about 1.3.

12. A method according to claim 1 wherein said second wood-derived tar-containing liquid smoke coating provides a casing absorptive index of at least about 1.

13. A method according to claim 1 wherein said second wood-derived tar-containing liquid smoke coating increases said article moisture content to between about 25% and about 37% dry cellulose.

14. A method according to claim 1 wherein the ketene dimer and liquid smoke coated casing article is further moisturized to moisture content between about 45% and about 55% dry cellulose.

15. A method according to claim 1 wherein said tar has a single mode mass spectrometric distribution bewteen about 200 and about 250 atomic mass units.

16. A method according to claim 1 wherein said tar is precipitated in a granular form.

17. A method for manufacturing according to claim 1, wherein said light transmittance is less than about 10%.

18. A method for manufacturing according to claim 1, wherein said light transmittance is about 0%.

19. In a process for stuffing food mass in a wood-derived tar-containing liquid smoke coated, fiber-reinforced peelable cellulosic casing using stuffing apparatus with at least one part in repeated frictional contact with the liquid smoke coating on the casing inner surface, the improvement comprising:
(a) providing a fiber-reinforced cellulosic casing article having between about 40% and about 65% moisture content based on the dry cellulose weight, a first ketene dimer peeling aid coating on the casing inner surface with said ketene dimer having two alkyl groups of at least eight carbon atoms, a second wood-derived tar-containing liquid smoke coating superimposed on and impregnated into the first ketene dimer peeling aid coating in sufficient quantity to provide a casing absorptive index of at least about 0.4 at 340 nm wavelength and said tar having a single mode mass spectrometic distribution below about 400 atomic mass units precipitated in the first and second coatings and within the casing wall, said tar-containing liquid smoke having a light transmittance at 590 nm of less than 50%;
(b) placing a part of the stuffing apparatus in repeated frictional contact with said liquid smoke coating of the casing article without substantial tar transfer from said liquid smoke coating to the stuffing apparatus part; and
(c) stuffing the food mass in the casing article.

20. A stuffing process according to claim 19 wherein the ketene dimer and liquid smoke coated casing article has a casing pH between about 2 and about 8.5.

21. A stuffing process according to claim 19 wherein the casing article is provided in the flat reeled form of at least 450 feet length.

22. A stuffing process according to claim 21 wherein the stuffing apparatus part is a horizontally reciprocal shuttle, and said shuttle and the opened casing move horizontally with the shuttle outer surface inside and in contiguous association with the liquid smoke coating as at least part of said repeated frictional contact.

23. A stuffing process according to claim 19, wherein said light transmittance is less than about 10%.

24. A stuffing process according to claim 19, wherein said light transmittance is about 0%.

25. A process for preparing an encased ham product comprising the steps of:
(a) providing a fiber-reinforced cellulosic casing article having between about 40% and about 65% moisture content based on the dry cellulose weight, a first ketene dimer peeling aid coating on the casing inner surface with said ketene dimer having two alkyl groups of at least eight carbon atoms, a second wood-derived tar-containing liquid smoke coating superimposed on and impregnated into the first ketene dimer peeling acid coating in sufficient quantity to provide a casing absorptive index of at least about 0.4 at 340 nm wavelength and said tar having a single mode mass spectrometric distribution between about 200 and about 250 atomic mass units precipitated in the first and second coatings and within the casing wall, said tar-containing liquid smoke having a light transmittance at 590 nm of less than 50%, said casing article being in the flat, reeled form having length of at least about 450 feet;
(b) unwinding an open end of the flat casing article and extending the inside surface of said open end over one end of a horizontally reciprocal cylindrically shaped shuttle at a first position;
(c) horizontally moving the casing open end shuttle assembly from said first position to a second position;
(d) extending the casing open end over the open first end of a stuffing horn in securing relation thereto at said second position;
(e) pushing a ham article through an open second end of said stuffing horn and outwardly through said first end of said casing article into said casing article;
(f) first clipping the ham - enclosing casing article at a longitudinal position between said ham and the horn first end so as to form a first closed end;
(g) horizontally retracting said shuttle from said second position through the casing article in repeated frictional contact with the casing liquid smoke coating to said first position;
(h) second clipping said ham - enclosing casing article at a longitudinal position between the retracted shuttle and the ham - enclosing casing article;
(i) severing the second clipped ham - containing casing article between the now clipped second end and the retracted shuttle;
(j) removing the first clipped and second clipped and severed ham - containing casing article as said encased ham product and repeating steps (c) through (i) with additional sections of the reeled casing article and additional hams until the reeled casing article is exhausted.

26. A processss according to claim 25 wherein the ketene dimer and liquid smoke coated casing article has a casing pH between about 2 and about 8.5.

27. A process according to claim 25, wherein said light transmittance is less than about 10%.

28. A process according to claim 25, wherein said light transmittance is about 0%.

* * * * *

UNITED STATES PATENT AND TRADEMARK OFFICE
CERTIFICATE OF CORRECTION

PATENT NO. : 5,030,464
DATED      : July 9, 1991
INVENTOR(S): James R. Hansen et al It is certified that error appears in the above-identified patent and that said Letters Patent is hereby corrected as shown below:

Cover page, title [54], delete the title and substitute
--MANUFACTURE AND USE OF LIQUID SMOKE IMPREGNATED
PEELABLE FIBROUS FOOD CASING--.

Column 20, line 17, delete "acid" and insert --aid--.

Signed and Sealed this

Thirty-first Day of January, 1995

Attest:

BRUCE LEHMAN

Attesting Officer

Commissioner of Patents and Trademarks